(12) United States Patent
Wu

(10) Patent No.: US 10,527,014 B2
(45) Date of Patent: Jan. 7, 2020

(54) DEMOUNT-FREE ELECTRICAL CLEANABLE FILTER

(71) Applicant: Chunlei Wu, Changzhou (CN)

(72) Inventor: Chunlei Wu, Changzhou (CN)

(*) Notice: Subject to any disclaimer, the term of this patent is extended or adjusted under 35 U.S.C. 154(b) by 421 days.

(21) Appl. No.: 15/469,605

(22) Filed: Mar. 27, 2017

(65) Prior Publication Data
US 2017/0356337 A1    Dec. 14, 2017

(30) Foreign Application Priority Data
Jun. 12, 2016    (CN) .......................... 2016 1 0403912

(51) Int. Cl.
*F02M 37/22*    (2019.01)
*B08B 1/00*     (2006.01)
(Continued)

(52) U.S. Cl.
CPC ............. *F02M 37/22* (2013.01); *B01D 29/33* (2013.01); *B01D 29/58* (2013.01); *B01D 29/64* (2013.01);
(Continued)

(58) Field of Classification Search
CPC ........ F02M 37/32; F02M 37/34; F02M 37/38; F02M 37/42; F02M 37/22; B01D 29/6469; B01D 29/6484; B01D 29/64; B01D 29/6452; B01D 29/6423; B01D 29/50; B01D 29/56; B01D 35/005; B01D 35/16; B01D 29/33; B01D 29/58; B01D 46/00; B08B 1/005; B08B 1/008; B08B 1/023; B08B 1/0436; B08B 7/00; B07B 1/526; F02B 2077/06; F02B 77/04
See application file for complete search history.

(56) References Cited

U.S. PATENT DOCUMENTS 1,849,201 A * 3/1932 Niemann ................ B08B 9/023
                                                    144/208.8
1,959,491 A * 5/1934 Moran ............... B01D 29/6484
                                                    210/413
(Continued)

FOREIGN PATENT DOCUMENTS

CN        204098994 U    1/2015
CN        204175356 U    2/2015
(Continued)

*Primary Examiner* — David C Mellon
(74) *Attorney, Agent, or Firm* — Gokalp Bayramoglu

(57) ABSTRACT

The present invention relates to a demount-free electrical cleanable filter, which includes a housing and a main filter cylinder in the housing. the housing is provided with a cleaning hoop and a reciprocating driving device. The cleaning hoop is sleeved on cylinder filtering material of the main filter cylinder. The reciprocating driving device drives the cleaning hoop to move up and down repeatedly, so as to conduct a clean-up operation on the main filter cylinder. The beneficial effect of the present invention is as follows. The present invention can be used in vehicle using fuel, engine and industry, environmental filtering, according to the flow rate and different designs of material. By a novel structure design, the lifetime of the present filter is greatly improved. During the entire life cycle of the filter, an apparatus which uses the present filter does not need to replace the fuel filter.

19 Claims, 3 Drawing Sheets

(51) Int. Cl.
  *B07B 1/52* (2006.01)
  *B01D 29/58* (2006.01)
  *B01D 29/64* (2006.01)
  *B01D 29/33* (2006.01)
  *B01D 46/00* (2006.01)
  *B08B 7/00* (2006.01)

(52) U.S. Cl.
  CPC ......... *B01D 29/6484* (2013.01); *B01D 46/00* (2013.01); *B07B 1/526* (2013.01); *B08B 1/008* (2013.01); *B08B 7/00* (2013.01)

(56) References Cited

U.S. PATENT DOCUMENTS

| | | | | |
|---|---|---|---|---|
| 3,574,098 | A | * | 4/1971 | Boorujy ................. B01D 29/15 210/668 |
| 3,583,413 | A | * | 6/1971 | Mertzanis .............. B01D 41/04 134/94.1 |
| 3,677,413 | A | * | 7/1972 | Boorujy .................. B01J 20/22 502/404 |

FOREIGN PATENT DOCUMENTS

| | | |
|---|---|---|
| CN | 105041418 A | 11/2015 |
| CN | 105508102 A | 4/2016 |
| CN | 206054151 U | 3/2017 |
| JP | H1043518 A | 2/1998 |

\* cited by examiner

DEMOUNT-FREE ELECTRICAL CLEANABLE FILTER

CROSS REFERENCE TO RELATED APPLICATIONS

This application is filed under the Paris Convention, and is based upon and claims priority to Chinese Patent Application No. CN201610403912.2, filed on Jun. 12, 2016, the entire contents of which are incorporated herein by reference.

TECHNICAL FIELD

The present invention relates to the technical field of filters, in particular, to a demount-free electrical cleanable filter.

BACKGROUND

The function of the fuel filter is to filter the harmful impurities and moisture in the fuel system, so as to guarantee the normal operation of the engine, reduce wear, prevent congestion, and improve the lifetime of the engine. In the prior art, after the fuel filter has been used for a certain period, impurities in the fuel will jam the filtering material in the filter, leading to the degradation of the filtering performance of the filtering material. Thus, regular replacement is necessary. Since the replaced fuel filter cannot be recycled, massive waste is caused. Moreover, residual fuel and filtered dirt in the fuel filter will contaminate the environment.

SUMMARY

The technical problem to be solved by the present invention is to provide a filter, which does not need to be replaced during its entire life cycle.

The technical solution used by the present invention to solve the technical problem is as follows. A demount-free electrical cleanable filter includes a housing and a main filter cylinder inside the housing. The housing is provided with a cleaning hoop and a reciprocating driving device. The cleaning hoop is sleeved on the cylinder filtering material of the main filter cylinder. The reciprocating driving device drives the cleaning hoop to move up and down repeatedly, such that a clean-up operation is conducted on the main filter cylinder.

Further, in order to hold most impurities in the primary filter cylinder, so as to reduce impurities entering the filter cavity to extend the lifetime of the main filter cylinder, the housing is divided into an upper cavity and a lower cavity, i.e., the filter cavity in the upper portion and the dirt cavity in the lower portion. The main filter cylinder is mounted in the filter cavity, dividing the filter cavity into a filter outer cavity and a filter inner cavity. The dirt cavity is mounted within a primary filter cylinder. The primary filter cylinder is provided with a primary filter inlet. An upper end of the housing is provided with a filter inlet and a filter outlet. The filter inlet is connected via the pipe to the primary filter inlet of the primary filter cylinder. The filter outlet communicates with the filter inner cavity. The dirt cavity communicates with the filter outer cavity. The fuel to be filtered enters the primary filter cylinder via the filter inlet, and the fuel is filtered by the primary filter cylinder. Next, the fuel enters the filter outer cavity via the dirt cavity. The fuel entering the filter outer cavity is filtered by the cylinder filtering material of the main filter cylinder. Next, the fuel enters the filter inner cavity. The fuel entering the filter inner cavity is discharged out of the filter via the filter outlet.

Further, the bottom of the dirt cavity is provided with a drain port. The drain port is provided with a drain cover which seals the drain port.

Further, the side of the primary filter cylinder and the side of the dirt cavity are provided with matching plug-in structures. The primary filter cylinder is inserted into the dirt cavity through the drain port, and is mounted in the dirt cavity via the matching plug-in structures, such that the primary filter cylinder and the dirt cavity are connected to each other via the plug-in structures. The primary filter inlet of the primary filter cylinder is connected to the pipe in a pluggable manner via the sealing part.

Further, the plug-in structures of the primary filter cylinder and the dirt cavity are dovetail joint and dovetail groove, respectively.

Further, the reciprocating driving device includes a motor and a screw rod reciprocating driving device. The motor is provided in the dirt cavity. The motor drives the screw rod reciprocating driving device.

Further, the screw rod reciprocating driving device includes more than one screw rods and a screw-nut structure provided on the cleaning hoop. The more than one screw rods are synchronized by the transmission mechanism. The screw rods are rotatably mounted in the filter outer cavity. The more than one screw rods pass through the screw-nut structure.

Further, the synchronous transmission mechanism is a gear synchronous transmission mechanism. The motor synchronously drives the screw rods to rotate clockwise or counterclockwise via the gear synchronous transmission mechanism.

Further, the cylinder filtering material of the main filter cylinder includes inner filtering material and a dirt absorption layer combined on the outer surface of the inner filtering material.

Further, an internal upper corner and an internal lower corner of the cleaning hoop are provided with an arc chamfer or a straight chamfer.

Further, the upper portion of the housing body is a metallic housing body which forms the filter cavity. The lower portion of the housing body is an organic plastic housing body which forms the dirt cavity. The metallic housing body is connected to the organic plastic housing body by rolling riveting. The pipe between the filter inlet and the primary filter inlet of the primary filter cylinder is a metal pipe. The metal pipe is provided along the cavity wall of the filter outer cavity closely.

The beneficial effects of the present invention are as follows. The present invention can be used in a vehicle which uses fuel, engine and industry, environmental filtering, according to the flow rate and different designs of material. By a novel structure design, the lifetime of the present filter is greatly improved. During the entire life cycle of the filter, an apparatus which uses the present filter does not need to replace the fuel filter. Thus, the cost decreases significantly. Resources are saved. The pollution of the environment is reduced.

BRIEF DESCRIPTION OF THE DRAWINGS

Hereinafter, the present invention is further described with reference to the figures and embodiments.

Figure 1:
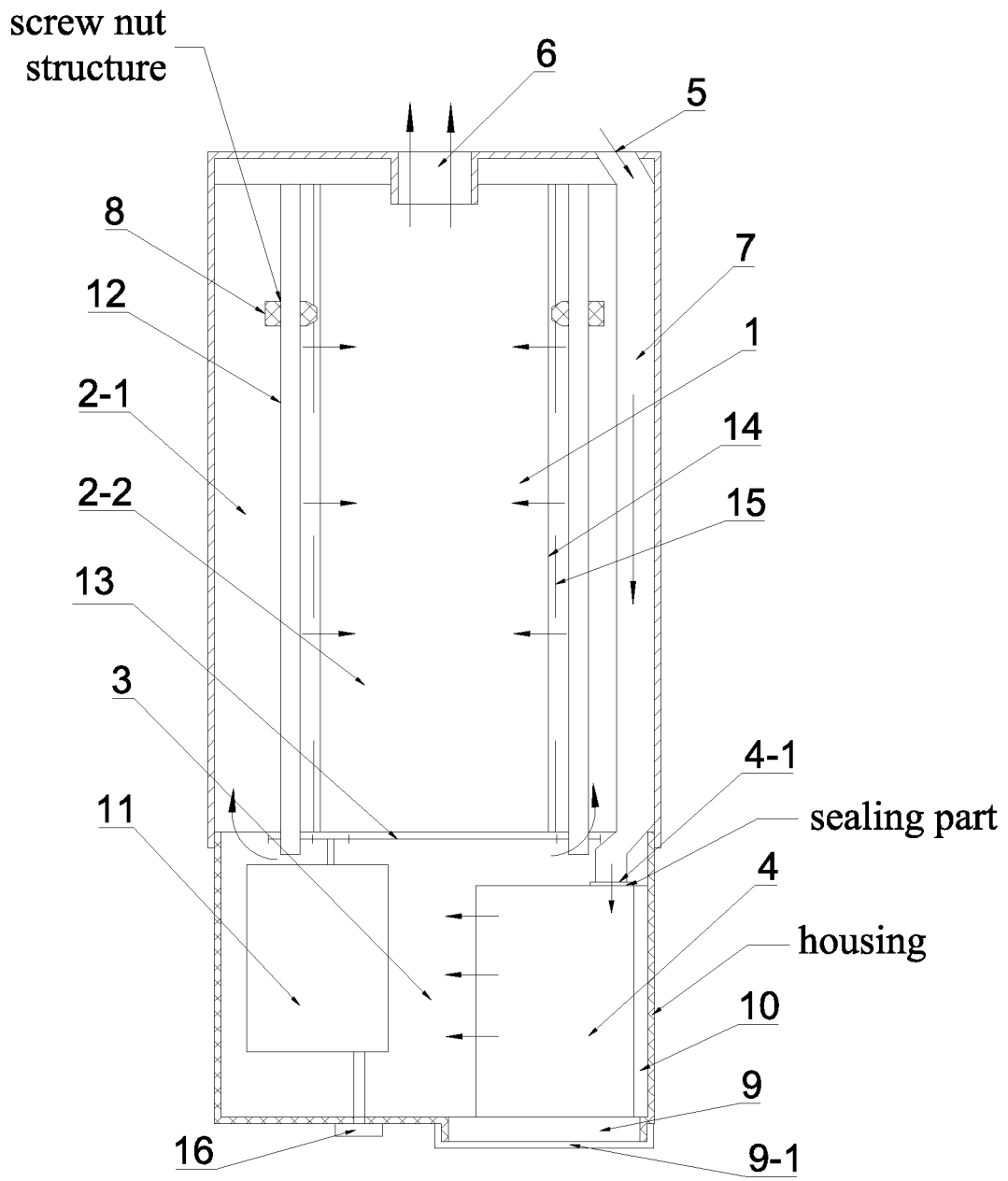
FIG. 1 is a structural schematic diagram of the present invention.

In the drawings: 1. main filter cylinder, 2-1. filter outer cavity, 2-2. filter inner cavity, 3. dirt cavity, 4. primary filter cylinder, 4-1. primary filter inlet, 5. filter inlet, 6. filter outlet, 7. pipe, 8. cleaning hoop, 9. drain port, 9-1. drain cover, 10. plug-in structure, 11. motor, 12. screw rod, 13. gear synchronous transmission mechanism, 14. inner filtering material, 15. dirt absorption layer, 16. power plug-in part.

DETAILED DESCRIPTION

As shown in FIG. 1, a demount-free electrical cleanable filter includes a housing and main filter cylinder 1 in the housing. The inside of the housing is divided into an upper cavity and a lower cavity, i.e., the filter cavity in the upper portion and dirt cavity 3 in the lower portion. Main filter cylinder 1 is mounted in the filter cavity, dividing the filter cavity into filter outer cavity 2-1 and filter inner cavity 2-2. Dirt cavity 3 is mounted within primary filter cylinder 4. Primary filter cylinder 4 is provided with primary filter inlet 4-1. An upper end of the housing is provided with filter inlet 5 and filter outlet 6. Filter inlet 5 is connected via pipe 7 to primary filter inlet 4-1 of primary filter cylinder 4. Filter outlet 6 communicates with filter inner cavity 2-2. Dirt cavity 3 communicates with filter outer cavity 2-1. The fuel to be filtered enters primary filter cylinder 4 via filter inlet 5. After being filtered by primary filter cylinder 4, the fuel enters filter outer cavity 2-1 of dirt cavity 3. The fuel entering filter outer cavity 2-1 is filtered by the cylinder filtering material of main filter cylinder 1. Next, the fuel enters filter inner cavity 2-2. The fuel entering filter inner cavity 2-2 is discharged out of the filter via the filter outlet. The housing has cleaning hoop 8 and reciprocating driving device. Cleaning hoop 8 is sleeved on cylinder filtering material of main filter cylinder 1. Reciprocating driving device drives cleaning hoop 8 to move up and down repeatedly, such that a clean-up operation is conducted on main filter cylinder 1.

The bottom of dirt cavity 3 is provided with drain port 9. Drain port 9 is provided with drain cover 9-1 which seals drain port 9. Specifically, drain cover 9-1 is a head of screw.

Figure 5A:
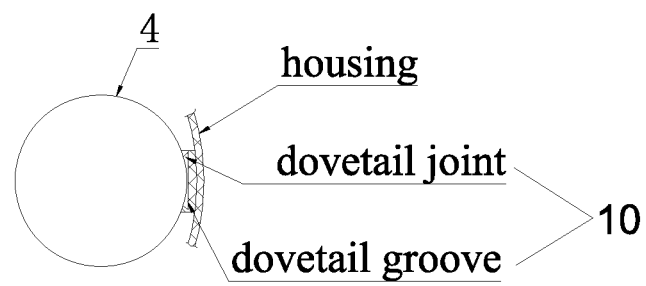
FIGS. 5A-5B show plug-in structures of primary filter cylinder and dirt cavity as a dovetail joint and dovetail groove provided on the primary filter cylinder and the dirt cavity respectively.
Figure 5B:
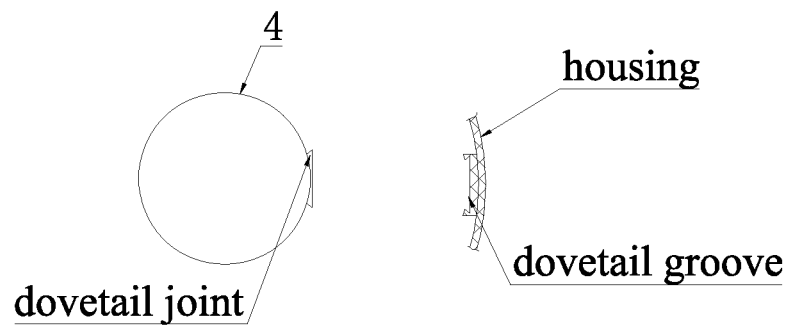

The cylinder filtering material of primary filter cylinder 4 is a stainless primary filter screen. The primary filter screen is a stainless steel sieve having pore size of 40 um. A side of primary filter cylinder 4 and a side of dirt cavity 3 are provided with matching plug-in structures 10. Primary filter cylinder 4 inserted into dirt cavity 3 from drain port 9 and mounted in dirt cavity 3 via the matching plug-in structures, such that primary filter cylinder 4 and dirt cavity 3 are connected to each other via plug-in structures 10. Primary filter inlet 4-1 of primary filter cylinder 4 is connected to pipe 7 in a pluggable manner via the sealing part. Plug-in structures 10 of primary filter cylinder 4 and dirt cavity 3 are respectively dovetail joint and dovetail groove as shown in FIGS. 5A-5B.

Reciprocating driving device includes motor 11 and a screw rod reciprocating driving device. Motor 11 is provided in dirt cavity 3. Motor 11 drives the screw rod reciprocating driving device. The screw rod reciprocating driving device includes more than one screw rods 12 and a screw-nut structure which is provided on cleaning hoop 8. Screw rods 12 are synchronized by a synchronous transmission mechanism. Screw rods 12 are rotatably mounted in filter outer cavity 2-1. Screw rods 12 pass through the screw-nut structure. The synchronous transmission mechanism is gear synchronous transmission mechanism 13. Motor 11 synchronously drives screw rods 12 to rotate clockwise or counterclockwise via gear synchronous transmission mechanism 13.

Main filter cylinder 1 includes an upper plate, a lower end, and cylinder filtering material between the upper end and the lower end. The cylinder filtering material of main filter cylinder 1 includes inner filtering material 14 and dirt absorption layer 15 which is combined on the outer surface of inner filtering material 14. Inner filtering material 14 is a stainless filtering screen. The pore size of the stainless filtering screen is 5 um. Dirt absorption layer 15 may use filter sponge. The thickness of dirt absorption layer 15 is 4~5 mm, preferably, 4.5 mm. The pore size of dirt absorption layer 15 is 20~25 um. The function of the dirt absorption layer is to preliminarily filter the fuel which enters the main filter cylinder, so as to block most of the impurities from entering inner filtering material 14. Moreover, since dirt absorption layer 15 has a good compression performance, the clean-up operation via the cleaning hoop is facilitated. Cleaning hoop 8 compresses dirt absorption layer 15 to 2.5~2.6 mm, and carries out the clean-up in a squeezing manner. A good clean-up result is achieved.

Figure 3:
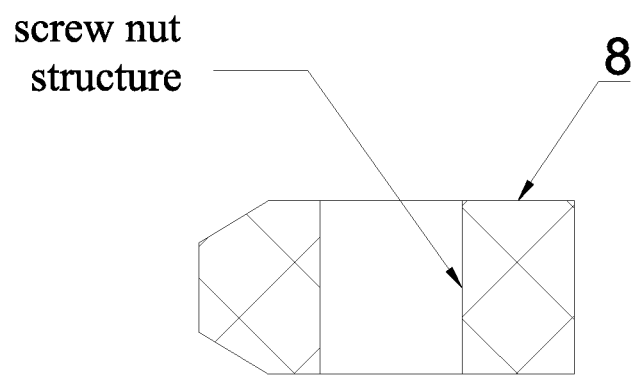
FIG. 3 is a structural schematic diagram of the cross-section of the cleaning hoop of the present invention where an internal lower corner of the cleaning hoop is provided with a straight chamfer.
Figure 4:
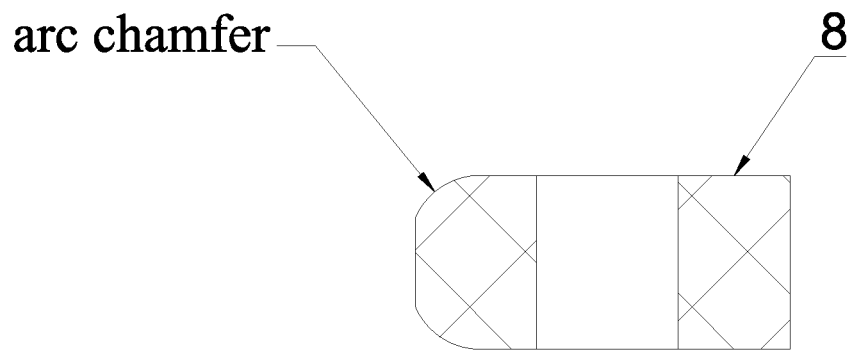
FIG. 4 is a structural schematic diagram of the cross-section of the cleaning hoop of the present invention where an internal lower corner of the cleaning hoop is provided with an arc chamfer.

As shown in FIG. 3, an internal upper corner and an internal lower corner of cleaning hoop 8 are provided with an arc chamfer or a straight chamfer.

The upper portion of the housing body is a metallic housing body which forms the filter cavity. The lower portion of the housing body is an organic plastic housing body which forms dirt cavity 3. The metallic housing body is connected to the organic plastic housing body by rolling riveting. Pipe 7 between filter inlet 5 and primary filter inlet 4-1 of primary filter cylinder 4 is a metal pipe. The metal pipe is provided along the cavity wall of filter outer cavity 2-1 closely.

Figure 2:
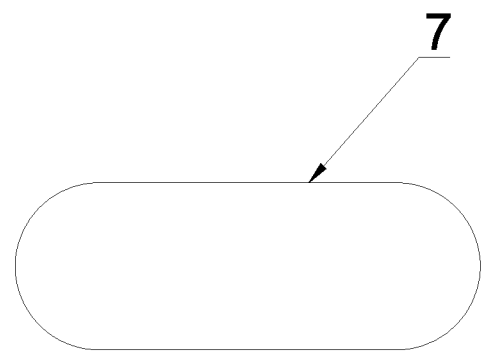
FIG. 2 is a structural schematic diagram of the cross-section of the pipe of the present invention.

As shown in FIG. 2, the cross section of pipe 7 has a tabular capsule shape. The metal pipe is a copper pipe. Filter outlet 6 is positioned at the center location of an upper end of the housing. Filter outlet 6 is provided with an internal thread. An upper end cover of main filter cylinder 1 can rotatably fit filter outlet 6 and can be sealed by the sealing part.

The bottom of the organic plastic housing body is provided with a power plug-in part. The power plug-in part is connected via the wire to the motor in the organic plastic housing body. The present filter is connected to the vehicle battery via the power contact part. The electrical connection between the vehicle battery and the motor is turned on or off via the clean-up switch. After the clean-up switch is turned on, the automatic cleaning is conducted for several minutes. Then, the drain cover 9-1 is opened. The cleaning procedure is carried out once.

The operation of the present demount-free electrical cleanable filter is as follows.

The fuel in the fuel tank is transferred to the present fuel filter via the fuel channel. The fuel enters from filter inlet 5 and enters primary filter cylinder 4 via pipe 7. After the fuel that enters primary filter cylinder 4 is preliminarily filtered by the cylinder filtering material of primary filter cylinder 4, the fuel enters dirt cavity 3. Next, the fuel enters filter outer cavity 2-1 from dirt cavity 3. After the fuel that enters filter outer cavity 2-1 is filtered by the cylinder filtering material of main filter cylinder 1, the fuel is discharged out of the filter from filter outlet 6.

After the present fuel filter has been used for a period of time, the operator manually or automatically turns on the clean-up switch, motor 11 starts to rotate, driving cleaning hoop 8 to move up and down. Cleaning hoop 8 cleans the main filter cylinder by scraping and squeezing the cylinder filtering material of main filter cylinder 1. When the cleaning is finished, drain cover 9-1 of drain port 9 is twisted off, and the fuel dirt is discharged. Otherwise, primary filter cylinder 4 can be replaced via drain port 9 if necessary.

What is claimed is:

1. A demount-free electrical cleanable filter, comprising:
   a housing;
   a main filter cylinder disposed in the housing, wherein the main filter cylinder includes a cylinder filtering material;
   a cleaning hoop disposed in the housing; wherein the cleaning hoop is sleeved on the cylinder filtering material of the main filter cylinder; and
   a reciprocating driving device disposed in the housing and configured to drive the cleaning hoop to move up and down repeatedly, so as to conduct a clean-up operation on the main filter cylinder;
   wherein
   the housing is divided into a filter cavity and a dirt cavity;
   the main filter cylinder is mounted in the filter cavity;
   the filter cavity is divided into a filter outer cavity and a filter inner cavity;
   a primary filter cylinder is mounted in the dirt cavity;
   the primary filter cylinder is provided with a primary filter inlet;
   an upper end of the housing is provided with a filter inlet and a filter outlet;
   the filter inlet is connected via a pipe to the primary filter inlet of the primary filter cylinder;
   the filter outlet communicates with the filter inner cavity;
   the dirt cavity communicates with the filter outer cavity;
   the primary filter cylinder is configured to primarily filter first fuel entering from the filter inlet such that a second fuel is obtained in the dirt cavity;
   the main filter cylinder is configured to filter the second fuel entering the filter outer cavity from the dirt cavity by the cylinder filtering material such that a third fuel is obtained in the filter inner cavity, wherein the third fuel is discharged via the filter outlet.

2. The demount-free electrical cleanable filter of claim 1, wherein the cylinder filtering material of the main filter cylinder includes inner filtering material and a dirt absorption layer combined on an outer surface of the inner filtering material.

3. The demount-free electrical cleanable filter of claim 1, wherein an internal upper corner and an internal lower corner of the cleaning hoop are provided with an arc chamfer or a straight chamfer.

4. The demount-free electrical cleanable filter of claim 1, wherein
   an upper portion of the housing is a metallic housing body which forms the filter cavity;
   a lower portion of the housing is an organic plastic housing body which forms the dirt cavity;
   the metallic housing body is connected to the organic plastic housing body;
   the pipe between the filter inlet and the primary filter inlet of the primary filter cylinder is a metal pipe; and
   the metal pipe is provided along a cavity wall of the filter outer cavity.

5. The demount-free electrical cleanable filter of claim 1, wherein the cylinder filtering material of the main filter cylinder includes inner filtering material and a dirt absorption layer combined on an outer surface of the inner filtering material.

6. The demount-free electrical cleanable filter of claim 1, wherein an internal upper corner and an internal lower corner of the cleaning hoop are provided with an arc chamfer or a straight chamfer.

7. The demount-free electrical cleanable filter of claim 1, wherein
   the reciprocating driving device includes a motor and a screw rod reciprocating driving device;
   the motor is provided in the dirt cavity; and
   the motor is configured to drive the screw rod reciprocating driving device.

8. The demount-free electrical cleanable filter of claim 7, wherein
   the screw rod reciprocating driving device includes a plurality of screw rods and a screw-nut structure provided on the cleaning hoop;
   the plurality of screw rods are synchronized by a synchronous transmission mechanism;
   the plurality of screw rods are rotatably mounted in the filter outer cavity; and
   the plurality of screw rods pass through the screw-nut structure.

9. The demount-free electrical cleanable filter of claim 8, wherein
   the synchronous transmission mechanism is a gear synchronous transmission mechanism; and
   the motor is configured to synchronously drive the plurality of screw rods to rotate clockwise or counterclockwise via the gear synchronous transmission mechanism.

10. The demount-free electrical cleanable filter of claim 1, wherein
    a bottom of the dirt cavity is provided with a drain port; and
    the drain port is provided with a drain cover which seals the drain port.

11. The demount-free electrical cleanable filter of claim 10, wherein
    an upper portion of the housing is a metallic housing body which forms the filter cavity;
    a lower portion of the housing is an organic plastic housing body which forms the dirt cavity;
    the metallic housing body is connected to the organic plastic housing body;
    the pipe between the filter inlet and the primary filter inlet of the primary filter cylinder is a metal pipe; and
    the metal pipe is provided along a cavity wall of the filter outer cavity.

12. The demount-free electrical cleanable filter of claim 10, wherein the cylinder filtering material of the main filter cylinder includes inner filtering material and a dirt absorption layer combined on an outer surface of the inner filtering material.

13. The demount-free electrical cleanable filter of claim 10, wherein an internal upper corner and an internal lower corner of the cleaning hoop are provided with an arc chamfer or a straight chamfer.

14. The demount-free electrical cleanable filter of claim 10, wherein a side of the primary filter cylinder is provided with a first matching plug-in structure; and a side of the dirt cavity is provided with a second matching plug-in structure;

the primary filter cylinder is configured to be inserted into the dirt cavity through the drain port, and mounted in the dirt cavity via the first and the second matching plug-in structures, such that the primary filter cylinder and the dirt cavity are connected to each other via the first and the second matching plug-in structures; and the primary filter inlet of the primary filter cylinder is connected to the pipe in a pluggable manner via a sealing part.

15. The demount-free electrical cleanable filter of claim 14, wherein the first matching plug-in structure is a dovetail joint, and the second matching plug-in structure is a dovetail groove.

16. The demount-free electrical cleanable filter of claim 14, wherein the first matching plug-in structure is a dovetail groove, and the second matching plug-in structure is a dovetail joint.

17. The demount-free electrical cleanable filter of claim 14, wherein an upper portion of the housing is a metallic housing body which forms the filter cavity;

a lower portion of the housing is an organic plastics housing body which forms the dirt cavity;

the metallic housing body is connected to the organic plastics housing body;

the pipe between the filter inlet and the primary filter inlet of the primary filter cylinder is a metal pipe; and the metal pipe is provided along a cavity wall of the filter outer cavity.

18. The demount-free electrical cleanable filter of claim 14, wherein the cylinder filtering material of the main filter cylinder includes inner filtering material and a dirt absorption layer combined on an outer surface of the inner filtering material.

19. The demount-free electrical cleanable filter of claim 14, wherein an internal upper corner and an internal lower corner of the cleaning hoop are provided with an arc chamfer or a straight chamfer.

* * * * *